(12) United States Patent
Dutta

(10) Patent No.: US 6,539,424 B1
(45) Date of Patent: Mar. 25, 2003

(54) RESTRICTING DEEP HYPERLINKING ON THE WORLD WIDE WEB

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/439,053

(22) Filed: Nov. 12, 1999

(51) Int. Cl.⁷ .............................................. G06F 13/00
(52) U.S. Cl. ......................... 709/219; 709/225; 707/10
(58) Field of Search .............................. 709/217, 219, 709/223, 224, 225, 227, 229, 3, 9, 10

(56) References Cited

U.S. PATENT DOCUMENTS

| 5,717,860 A | * | 2/1998 | Graber et al. ............... 709/217 |
| 5,774,670 A | | 6/1998 | Montulli |
| 5,826,242 A | | 10/1998 | Montulli |
| 5,920,859 A | | 7/1999 | Li |
| 6,037,935 A | * | 3/2000 | Bates et al. .................. 345/335 |
| 6,226,677 B1 | * | 5/2001 | Slemmer ..................... 709/227 |
| 6,226,752 B1 | * | 5/2001 | Gupta et al. ................. 713/201 |

FOREIGN PATENT DOCUMENTS

| GB | 2327514 | 6/1998 |
| JP | 10124518 | 10/1996 |
| JP | 10222415 | 2/1997 |
| JP | 10333966 | 5/1997 |
| JP | 11025098 | 6/1997 |

OTHER PUBLICATIONS

"Is Linking Always Legal? The Experts Ar en't Sure"—C. S. Kaplgan, New York Times, Issue Aug. 6, 1999.
"Persistent Context for World Wide Web Browsers", IBM Technical Disclosure Bulletin, vol. 40, No. 02, 2/97, p. 215–216.

* cited by examiner

Primary Examiner—Viet D. Vu
(74) Attorney, Agent, or Firm—Marilyn Smith Dawkins

(57) ABSTRACT

The system, method and program of the invention enables a content provider to maintain control over the way in which a user may view the content provider's information. If the content provider receives a request for a Web page that is a deep hyperlink into the content provider's Web site, the content provider reroutes the request to the content provider's Home page. In addition, the content provider explicitly displays to the user, in an attached note, the next link or sequence of links that the user should follow in order for the user to get to the desired deep link. As such, users are restricted from entering deeply into Web sites and bypassing a Web site's home page.

19 Claims, 4 Drawing Sheets

RESTRICTING DEEP HYPERLINKING ON THE WORLD WIDE WEB

BACKGROUND OF THE INVENTION

1. Field of the Invention

This invention relates to hyperlinking on the World Wide Web, and more specifically to a system, method and program for restricting deep hyperlinking into Web sites of other content producers by rerouting a deep hyperlink to the home page of the Web site along with directions for the sequence of links to get to the deep link from the home page.

2. Description of the Related Art

The Internet, initially referred to as a collection of "interconnected networks", is a set of computer networks, possibly dissimilar, joined together by means of gateways that handle data transfer and the conversion of messages from the sending network to the protocols used by the receiving network. When capitalized, the term "Internet" refers to the collection of networks and gateways that use the TCP/IP suite or protocols.

Currently, the most commonly employed method of transferring data over the Internet is to employ the World Wide Web environment, referred to herein as "the Web".

Other Internet resources exist for transferring information, such as File Transfer Protocol (FTP) and Gopher, but have not achieved the popularity of the Web. In the Web environment, servers and clients effect data transfer using the Hypertext Transfer Protocol (HTTP), a known protocol for handling the transfer of various data files (e.g., text, still graphic images, audio, motion video, etc.).

Deep hyperlinks point directly to Web pages or other content of a different Web site. This may possibly result in bypassing the advertising-rich home pages or other identifying pages for the different Web site. Also, the original source, i.e., the content provider, of the content of a deep link can become obscure.

For clarification, a content provider is used herein to refer to the owner of the content that is being linked to; and a content aggregator is an entity that provides links to the sites of the content providers and may not necessarily provide any original content.

Consequently, legal controversies over deep linking have developed. On the one side, some believe that deep linking should be illegal. For example, intellectual property owners of content rich information, such as movie studios, believe that they have the right to protect their rights to their Web page content by not permitting others to link to their sites that contain copyrighted material without their specific authorization. They believe that property owners who create content should have a right to determine how others experience their Web site. Also, if advertising-rich home pages are bypassed, then the owner of those sites may suffer diminished revenue.

On the other hand, since linking is what the Web is all about, others believe that if links are banned or restrictions are put on linking, then the whole Internet would have to undergo a transformation. The whole point of the Web is for everything to be linked to everything else. The belief by some is that deep linking should be permissible because anyone who creates a Web page in effect grants the cyberspace community at large an implied license to link to it.

The controversies surrounding deep linking were exemplified in a lawsuit between a content provider and a content aggregator over such links. The content provider was an established business within the Internet environment and within the outside physical world. The content provider sold tickets to concerts, plays, sports events, and other events. A customer could buy tickets from the content provider through the Web, by the phone, and by physically going to other outlets. For example, the content provider had arrangements with music stores, shopping malls, and other locations to sell tickets at such given locations. To buy tickets over the Web, a user would access the content provider's home page, and follow links to purchase the desired tickets. While the customer traversed the applicable links from the home page to purchase the desired tickets, the user would see other events and any associated advertising for such other events. It appears that a content aggregator provided a city guide Web site that offered full service to customers which included links to the content provider to buy tickets. Although the content provider still received payment for tickets purchased from users via the content aggregator link, the content provider was not receiving the full benefit of being the owner of its Web site. That is, the content provider was not able to serve each of its customers in its own desired manner since the customers from the content aggregator were being lead deep into the content provider's site avoiding the information provided by the content provider on its home page and subsequent pages. As such, the content aggregator was drawing customers to its own site even though it did not provide the tickets through its own Web server, thereby generating additional advertising revenue for itself.

Currently, one way in which a content provider can protect access to particular information within its Web site is to grant authorization through the use of id's and passwords. If every user becomes authorized through each user's own password, at least the content provider has the means to know how many users are accessing the site and a form of identity of those users. The content provider can use this information as a means for compensation, i.e., by using subscription fees in exchange for authorization, or to use the identifying user information to send advertising promotions to in order to keep the content producer in business. As such, a content provider can protect access to particular information by using passwords which prevent anyone from going deep inside their page unless authorized.

The problem with this approach is that if every content provider required passwords, then a user would have an unmanageable number of different passwords that the user would have to keep track of for all of the different possible content producers the user would access. As such, password authorization schemes on the Internet are burdensome to users.

SUMMARY OF THE INVENTION

It is an object of the invention to prevent deep hyperlinking on the Web in a way that is beneficial to each involved entity.

It is a further object of the invention to prevent deep hyperlinking on the Web independently of, i.e., without, password or other authorization schemes.

The system, method and program of the invention enables a content provider to maintain control over the way in which a user may view the content provider's information. If the content provider receives a request for a Web page that is a deep hyperlink into the content provider's Web site, the content provider reroutes the request to the content provider's home page. In addition, the content provider displays to the user the next link or sequence of links that the user should follow in order for the user to get to the desired deep link. As such, users are restricted from entering deeply into Web sites and bypassing a Web site's home page.

In a preferred embodiment, cookies are sent by the Web server to the client. The cookies keep track of the originally requested deep hyperlinked page, and the path being followed by a user through the various pages from the home page to reach the desired page.

As such, a win-win-win situation is provided for the content aggregator, the content producer, and the user. The content aggregator can continue to provide a service to users by referencing pre-existing information owned by others by providing deep hyperlinks to the Web pages of these other owners. The content producer maintains control of the information, and the way in which the information is to be viewed by any and every user. The content producer can ensure that each user sees the home page and other pages on the way to the deeply hyperlinked page. As such, the content producer can require the user to view other content, advertisements, etc., through the order of traversal of the Web pages given to the user. The user gets the information the user is looking for, and with clear instructions as to how to reach it, without searching aimlessly for it. The user has some overhead in that the user is required to see multiple pages before viewing the deeply hyperlinked page. However, the time to do this is relatively small since the user, in coordination with the content producer, can do an HTTP GET of all of the pages before seeing them, thereby saving time while "waiting" for each page.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
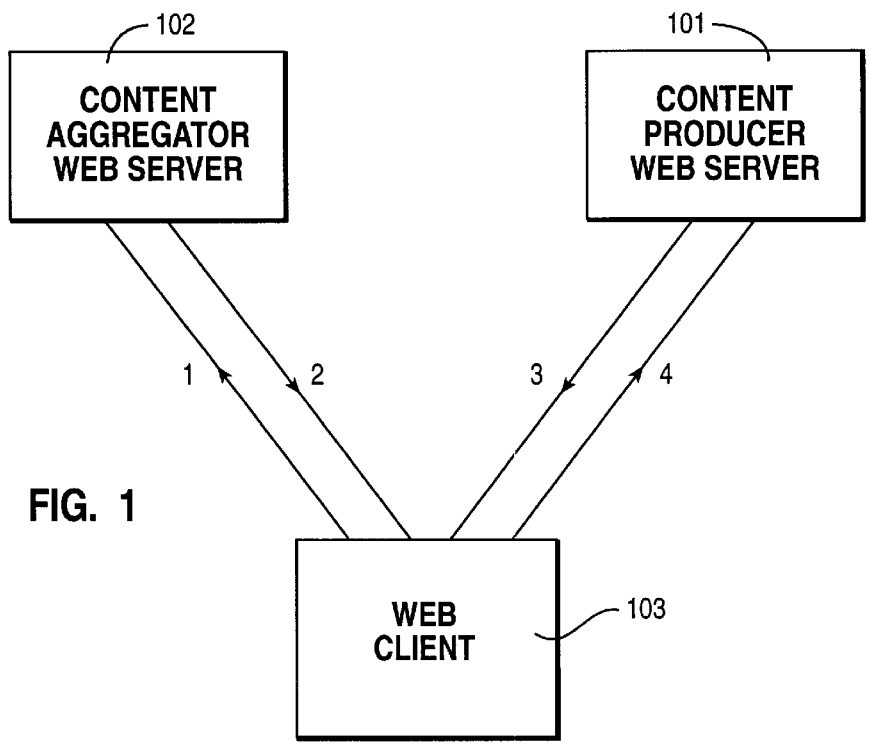
FIG. 1 shows a content producer Web server and a content aggregator Web server in communication with a Web client over a network.

FIG. 1 shows a content producer Web server 101 and a content aggregator Web server 102 in communication with a Web client 103 over communication paths 1, 2, 3, and 4. The Web client 103 first connects to the content aggregator 102 in communication 1 and receives a response in communication 2. The response is a pointer to the content producer which the Web client 103 goes to via communication 3. The Web client 103 receives a response via communication 4. In the prior art, the response 2 is a pointer to a deep hyperlink in the content producer's Web page, and communication 3 goes directly to that deep hyperlink.

In the system, method, and program of this invention, the Web client's communication 3 to the deep hyperlink is rerouted by the content producer Web server to the content producer's home page. The user of the Web client then follows the appropriate links down from the home page to the desired page. By enabling the content producer's Web server to redirect deep hyperlinking back to its home page, the content producer maintains control of the information, including any advertising, that it desires all of its customers to view when accessing its content. Redirecting deep hyperlinks to the content producer's home page is beneficial to the content producer since it gets the benefit of others linking to it which is good for advertising purposes by increasing its customer base. Also, all customers see all of the required information as desired by the content producer. At the same time, content aggregators are benefited in continuing to meet their customer's needs by allowing them to send their customers to other sites for additional data and information that the content aggregator does not necessarily maintain.

Figure 2A:
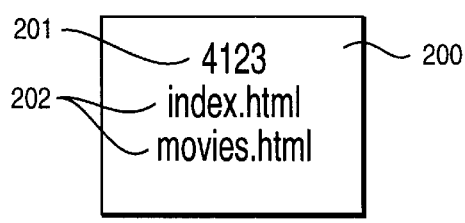
FIG. 2A shows a client side cookie which is sent between a Web client and a content producer server.

A client side cookie which is sent between a Web client 103 and content producer server 101 is shown in FIG. 2A. A cookie is used in a similar way as a security badge is used to gain access to physical buildings. As such, a cookie is used to gain access to various pages within a content producer's Web site. In general, cookies can contain user names, passwords, access rights, and, in some embodiments, payment information. Advertisers also include in cookies the pages that have been visited so that an advertiser knows which advertisements the client has already viewed. It should be noted that cookies can be implemented in many different ways.

More specifically for the preferred embodiment of this invention, in the client side cookie 200, there may be a number or identifier 201 for the user/client, and html pages 202 that can be accessed by that user/client. Every time that the Web client visits the content producer, the cookie is automatically passed to the content producer. The content producer receives the user identification 201 and the pages 202 that the client can access.

Figure 2B:
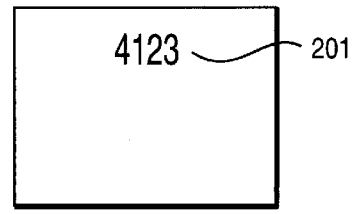
FIG. 2B shows a server-side cookie containing only an identifier of the client which is sent to a content producer server which accesses a database to determine the access authorization for specific pages.

The server can optionally store this information in a database. In such a situation, the client does not require as much space to store its cookie since all of its permissions 202 are stored at the server. The client merely sends to the server its identifier 201 in a cookie as shown in FIG. 2B. The server then goes to its database to see what pages the user having that identifier can access. FIG. 2B illustrates a server-side cookie that can be used when the content producer server accesses a database to determine which pages a given client can access.

Figure 3:
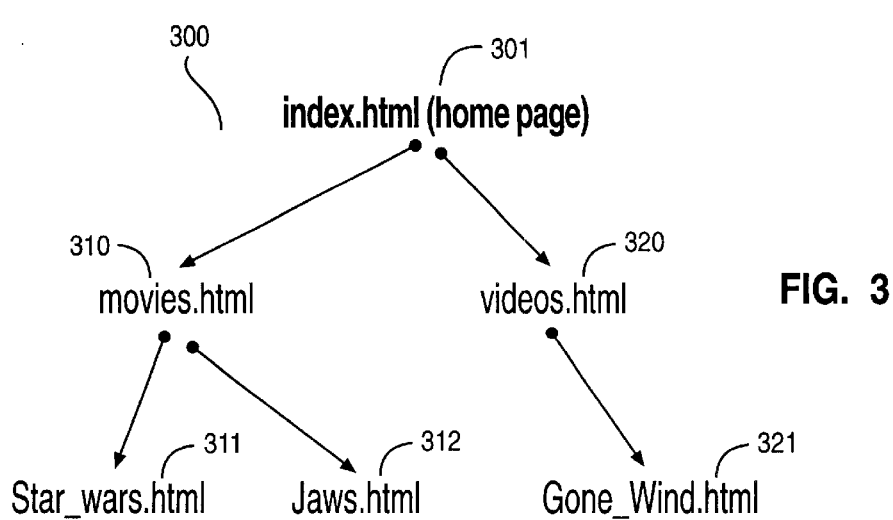
FIG. 3 illustrates the hyperlinking structure of exemplary Web pages of a content producer.

FIG. 3 shows the hyperlinking structure of the Web pages of a content producer, www.producer.com. Assume that a movie content producer such as Universal Pictures has a home page 301 having movies (movies.html 310) and videos (videos.html 320) including the movies Star Wars and Jaws (star_wars.html 311, jaws.html 312), and the video of Gone With the Wind (gone_wind.html 321). The hyperlinking structure is shown to be a hierarchical tree structure having higher and lower levels of pages. The home page 301 is at the highest level. Movies.html 310 and videos.html 320 are lower level pages of the home page 301. Movies.html is a higher level page of Star_wars.html 311 and Jaws.html 312; and videos.html 320 is a higher level page of Gone_Wind.html 321. Star_wars.html 311 and Jaws.html; 312 are lower level pages of Movies.html 310. Gone_Wind.html is a lower level page of videos.html 320. As described herein, any link other than to the home page, index.html 301, can be considered to be a deep link. To indicate to a client the sequential links from the home page to the deep link Jaws.html, the server would specify in a simplified manner, such as in a note, movies.html and Jaws.html. It should be noted that the sequential links, and the hierarchical tree structure, are defined by the content provider server.

An aggregator may have a home page that collects all of the movies about fish. The content aggregator may then have a Web page with a hyperlink into the content producer's page, "www.producer.com/Jaws.html", 312. This is a deep hyperlink as it bypasses the home page index, index.html 301, and the index on movies, movies.html 310, and goes directly to the movie Jaws, Jaws.html 312.

Figure 4:
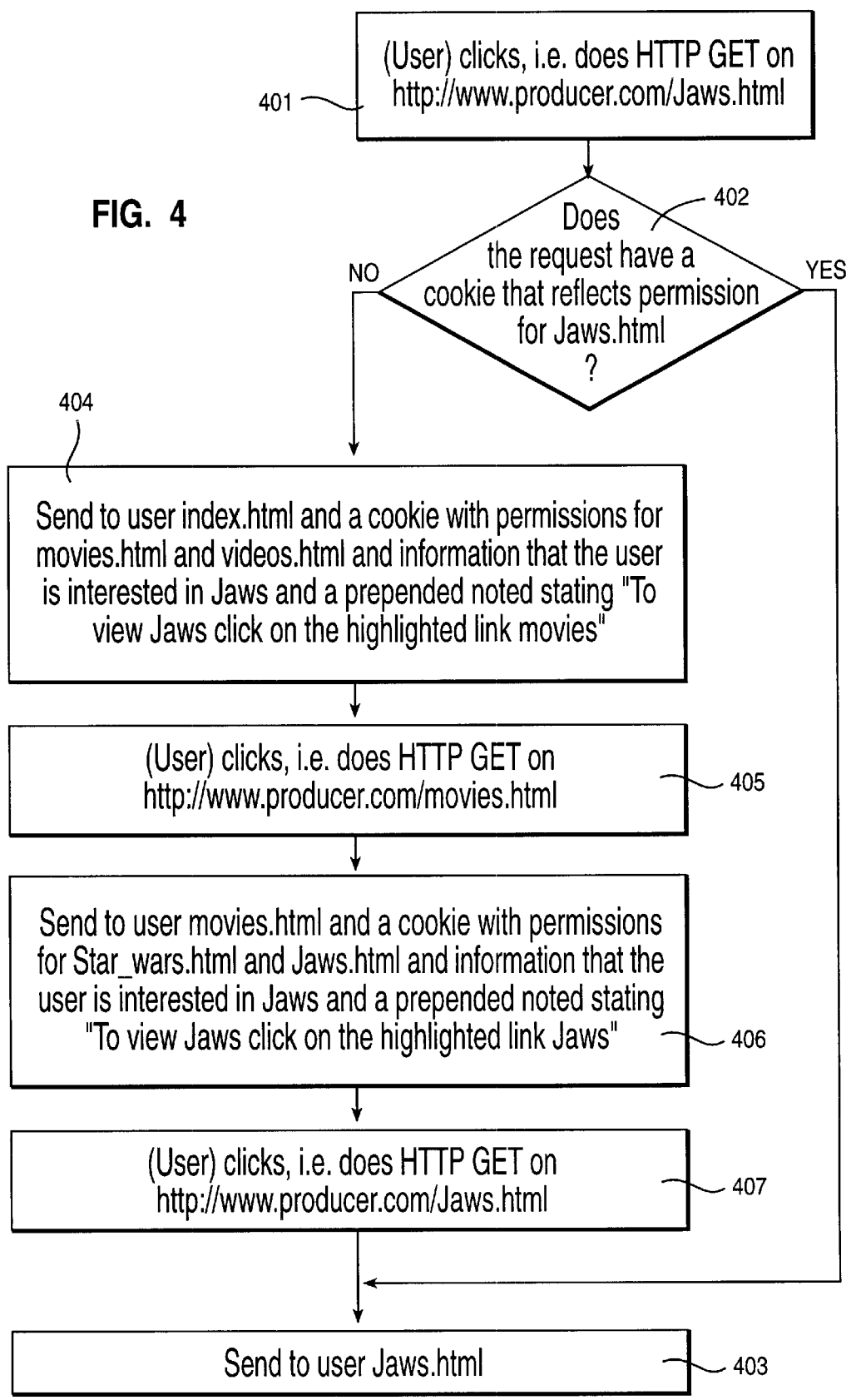
FIG. 4 shows a flowchart for a method of restricting deep hyperlinking.

A method for restricting deep hyperlinking is shown in FIG. 4. The method of FIG. 4 is described with reference to the hyperlink structure shown in FIG. 3 and the various entries for the cookie shown in FIGS. 5A–5D. The cookie can be stored in the client, i.e., a client-side cookie, or it can be stored in the server, i.e., a server-side cookie. If it is stored in the server, the client has the <UserID> stored in a small cookie that is sent to the server each time that it attempts to access something in the server. The server maps the <UserID> to the corresponding cookie stored in the server. The cookie stored at the server would contain various entries corresponding to permissions for certain pages at the server. For simplicity, a preferred embodiment of the invention is further described as if the cookies in FIGS. 5A–5D were client-side cookies. Nevertheless, the preferred embodiment could likewise be implemented using server-side cookies.

As shown in FIG. 4, the method begins when a user clicks on, i.e., performs an HTTP GET on, http://www.producer.com/Jaws.html, step 401, a deep hyperlink within the Web pages of producer.com. The user may be clicking on this deep hyperlink from within a Web page of a content aggregator, or entering the URI directly into a browser, or by other means. The server for producer.com determines if the request has a cookie that reflects permission for Jaws.html, step 402. If it does have a cookie, e.g., as shown in FIG. 5B or 5D with permission for Jaws.html 522, then the server sends Jaws.html to the user, step 403. It should be noted that the cookie shown in FIG. 5B is shown as an example only, as the server may or may not generate such a cookie. The cookie shown in FIG. 5D is the cookie that typically would be generated by the preferred embodiment of the invention.

Figure 5A:
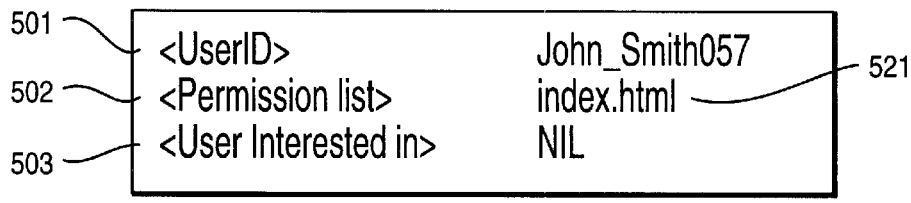
FIGS. 5A–5D illustrate the various entries in a cookie at various points within the flowchart for the method shown in FIG. 4.
Figure 5B:
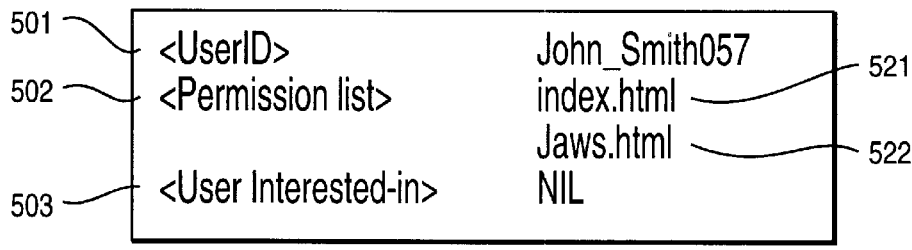

If there is not a cookie that reflects permission for Jaws.html, e.g., the cookie shown in FIG. 5A with permission for the home page only, index.html 521; then the process continues at step 404. If there is no cookie at all, the server assigns an unique <UserID>, and sends a cookie to the client. The UserID in most cases would be a long unique string. For convenience it is shown as John_Smith057.

Figure 5C:
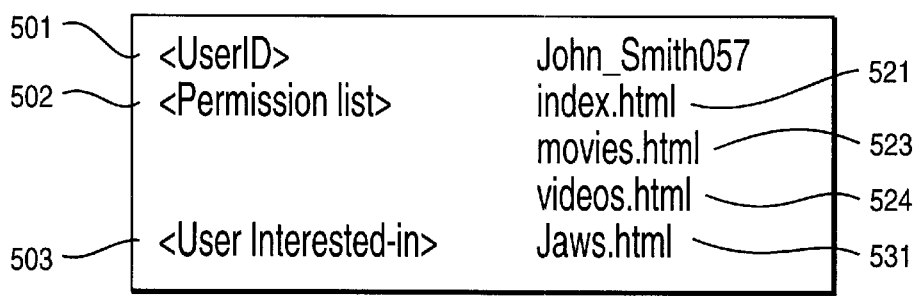
Figure 5D:
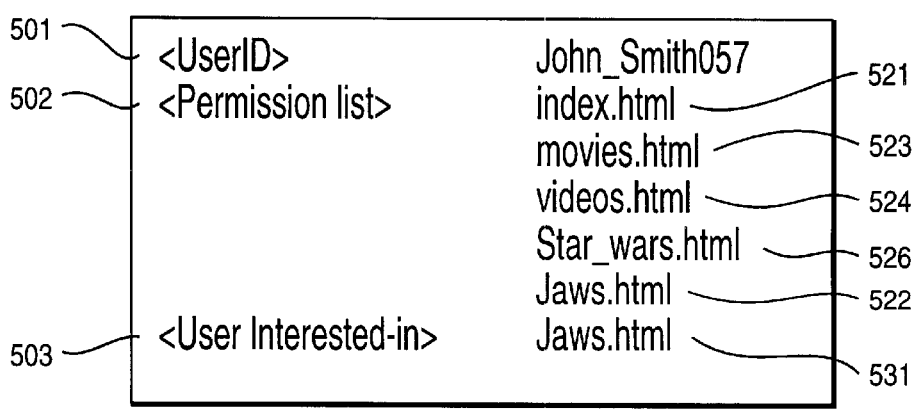

The cookie that is sent from the server to the client also contains permission 521 for the home page, index.html, as shown in FIG. 5C. The cookie sent to the client includes an indication that the user is interested in Jaws.html 531 in the <User Interested-in> field 503. The server determines what the user is interested in from the initial request to the deep link. In addition, in response to the initial request for the deep link http://www.producer.com/Jaws.html, the server sends back to the client the home page, i.e., index.html, with the cookie as shown in FIG. 5C, indicating permissions for movies.html and videos.html. In other words, in response to a request for a deeply linked page; a home page, or other given page, is sent to the client. A corresponding cookie is also sent which gives permission for any links 523, 524 stemming from the sent page.

The server also sends information to the user indicating that the user is interested in a given page which the user attempted to deep link to, and an appended note instructing the user how to access the page desired by the user. For example, a sample note may state "To view Jaws, click on the highlighted link 'movies'", step 404.

In another embodiment, the server could merely send the user back to the home page. In such an embodiment, the user could get lost or spend too much time trying to get from the home page to the specific underlying page or link. Because of this, the preferred embodiment includes a statement displayed to the user with the home page informing the user how to get to the user's desired page.

Each time a cookie is sent by the user, the server sends back a modified cookie which contains permissions for the next level of sequentially linked page(s) until the page the user is interested in is finally sent.

After receiving the note, the user clicks, i.e., does HTTP GET, on http://www.producer.com/movies.html, step 405. The server then sends to the user movies.html and a cookie with permissions 526, 522, for Star_wars.html and Jaws.html, as shown in FIG. 5D. The server also sends information to the user indicating that the user is interested in Jaws and an appended note stating "To view Jaws, click on the highlighted link Jaws", step 406. The user clicks, i.e., does HTTP GET, on http://www.producer.com/Jaws.html, step 407. The server then sends to the user Jaws.html.

If a user attempts to go to a deep link within a content producer's server, then the user is sent to the content producer's home page with information on how to get to the user's desired page from the home page. The user is also sent a cookie with permission to get to the next child page and/or to the desired page. In a preferred embodiment, the information merely details what the next link is in order for the user to eventually get to the user's desired page. Likewise, a cookie is sent to the user with permission only for the next page in the hierarchical links to the desired page. When the next page is received, then the process is repeated until the user gets to the desired page. In this way, the user is required to see all of the pages in the hierarchical structure as set out by the content producer.

In other preferred embodiments, the content provider may only require that a client see only its home page, or some other number of pages that is less than the full number of sequentially linked pages to the desired deeply linked page. In these embodiments, the content provider would send to the client an appended note with the link or links needed to reach the deeply linked page along with a cookie with the appropriate permissions, thereby eliminating the number of iterative requests for the next sequentially linked page.

As noted above, the cookies can be implemented with either a client side cookie stored in the client, or with a server side cookie in which the client stores only a small reference to the cookie that is stored at the server.

As such, when a user clicks on a deep hyperlink in a Web page of a content aggregator, the user is forced by the content producer to go to the content producer's home page, and then to follow a set of predetermined links to read the contents of the page referred to by the deep hyperlink.

The preferred embodiments may be implemented as a method, system, or article of manufacture using standard programming and/or engineering techniques to produce software, firmware, hardware, or any combination thereof. The term "article of manufacture" (or alternatively, "computer program product") as used herein is intended to encompass data, instructions, program code, and/or one or more computer programs, and/or data files accessible from one or more computer usable devices, carriers, or media. Examples of computer usable mediums include, but are not limited to: nonvolatile, hard-coded type mediums such as read only memories (ROMs) or erasable, electrically programmable read only memories (EEPROMs), recordable type mediums such as floppy disks, hard disk drives and CD-ROMS, and transmission type mediums such as digital and analog communication links, or any signal bearing media.

The foregoing description of the preferred embodiments of the invention has been presented for the purposes of illustration and description. It is not intended to be exhaustive or to limit the invention to the precise form disclosed. Many modification and variations are possible in light of the above teaching. For example, although preferred embodiments of the invention have been described in terms of the Internet, other network environments including but not limited to wide area networks, intranets, and dial up connectivity systems using any network protocol that provides basic data transfer mechanisms may be used.

Figure 6:
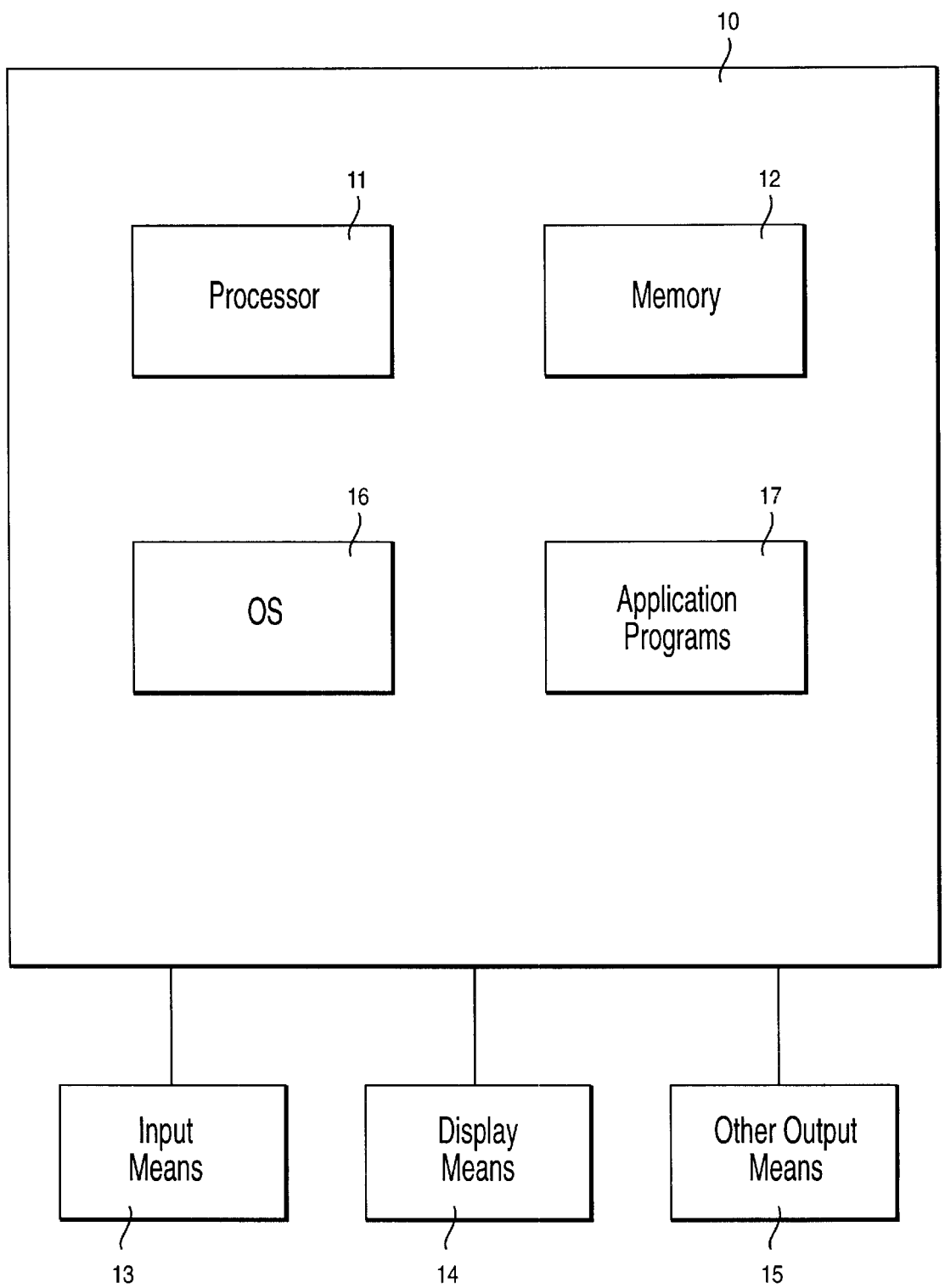
FIG. 6 illustrates a block diagram of a computer system that may be used as a server and/or a client in the network system.

FIG. 6 depicts a block diagram of a typical computer system used as a client or server or both. The computer includes at least one processor 11 and memory 12. The computer may be, but is not limited to, a personal computer, laptop, workstation, mainframe or hand held computer including palmtops, personal digital assistants, smart phones, cellular phones, etc.. The computer system includes input means 13 such as keyboard, mouse, track ball, light pen, pen-stylus, voice input system, touch sensitive device, and/or any other input means. Also included are display means 14 and/or any other output device including network communication devices. Memory 12 includes volatile or nonvolatile storage and/or any combination thereof. Volatile memory may be any suitable volatile memory device, e.g., RAM, DRAM, SRAM, etc.. Nonvolatile memory may include storage space, e.g., via the use of hard disk drives, tapes, etc., for data, databases, and programs. The programs in memory include an operating system 16 and application programs 17. For the client, one of the application programs would include a browser.

The exemplary embodiment shown in FIG. 6 is provided solely for the purposes of explaining the preferred embodiments of the invention; and those skilled in the art will recognize that numerous variations are possible, both in form and function. For instance, any one or more of the following—the processor and/or memory and/or the input/output devices—could be resident on separate systems such as in a network environment.

It is intended that the scope of the invention be limited not by this detailed description, but rather by the claims appended hereto. The above specification, examples and data provide a complete description of the manufacture and use of the system, method, and article of manufacture, i.e., computer program product, of the invention. Since many embodiments of the invention can be made without departing from the spirit and scope of the invention, the invention resides in the claims hereinafter appended.

What is claimed is:

1. A computer program on a computer usable medium having computer readable program code means, comprising:
   means for receiving a request for a desired page deeply linked within other pages;
   means for sending a higher level page, in response to the request, along with an indication of a next page having a next sequential link to subsequently reach the desired page; and
   means for repeatedly sending the next page, in response to each request for the next page from the client, along with an indication of a subsequent page having a subsequent link for the client to follow, until the desired page has been sent.

2. A method, in a server system connected to a network, comprising:
   receiving a request, from a client, for a page deeply linked within other pages; and
   sending a higher level page, in response to the request, along with an indication of a sequence of links for the client to follow from the higher level page to the deeply linked page.

3. The method of claim 2 wherein the higher level page is a home page for the other pages; and the sequence of links are defined by the server.

4. The method of claim 2 wherein the sequence of links is a next sequential link within a hierarchy of links from the higher level page to the deeply linked page.

5. A method, in a server system connected to a network, comprising:
   receiving a request, from a client, for a desired page deeply linked within other pages;
   sending a higher level page, in response to the request, along with an indication of a next page having a next sequential link for the client to follow to subsequently reach the desired page; and
   repeatedly sending the next page, in response to each request for the next page from the client, along with an indication of a subsequent page having a subsequent link for the client to follow, until the desired page has been sent.

6. The method of claim 5 further comprising sending a cookie to the client granting permission to the next page wherein the cookie is received from the client along with the request for the next page.

7. A method, in a client system connected to a network, comprising:
   sending a request, to a server, for a page deeply linked within other pages; and
   receiving a higher level page, in response to the request, along with an indication of a sequence of links to follow from the higher level page to the deeply linked page.

8. A method, in a client system connected to a network, comprising:
   i) sending a request, to a server, for a desired page deeply linked within other pages;
   ii) receiving a higher level page, in response to the request, along with an indication of a next lower page as a sequential link to follow to subsequently reach the desired page; and
   iii) requesting the next lower page;
   iv) receiving the next lower page along with an indication of another next lower page as a next sequential link to follow; and v) repeating steps iii) and iv) until the desired page has been received.

9. The method of claim 8 further comprising receiving a cookie, when a page is received, with a permission to receive the next lower page.

10. The program of claim 1 further comprising means for sending a cookie granting permission to the next page, and means for subsequently receiving the cookie along with the request for the next page.

11. A server connected to a network, comprising:

means for receiving a request, from a client, for a page deeply linked within other pages; and means for sending a higher level page, in response to the request, along with an indication of a sequence of links for the client to follow from the higher level page to the deeply linked page.

12. The server of claim 11 wherein the higher level page is a home page for the other pages.

13. The server of claim 11 wherein the sequence of links is a next sequential link within a hierarchy of links from the higher level page to the deeply linked page.

14. A server connected to a network, comprising:

means for receiving a request, from a client, for a desired page deeply linked within other pages;

means for sending a higher level page, in response to the request, along with an indication of a next page having a next sequential link for the client to follow to subsequently reach the desired page; and means for repeatedly sending the next page, in response to each request for the next page from the client, along with an indication of a subsequent page having a subsequent link for the client to follow, until the desired page has been sent.

15. The server of claim 14 further comprising means for sending a cookie to the client granting permission to the next page, and means for subsequently receiving the cookie from the client along with the request for the next page.

16. A client connected to a network, comprising:

means for sending a request, to a server, for a page deeply linked within other pages; and means for receiving a higher level page, in response to the request, along with an indication of a sequence of links to follow from the higher level page to the deeply linked page.

17. A client, connected to a network, comprising:

i) means for sending a request, to a server, for a desired page deeply linked within other pages;

ii) means for receiving a higher level page, in response to the request, along with an indication of a next lower page as a sequential link to follow to subsequently reach the desired page; and iii) means for requesting the next lower page;

iv) means for receiving the next lower page along with an indication of another next lower page as a next sequential link to follow; and v) means for repeatedly employing means iii) and iv) until the desired page has been received.

18. The client of claim 17 further comprising means for receiving a cookie, when a page is received, with a permission to receive the next lower page.

19. A computer program on a computer usable medium having computer readable program code means, comprising:

means for receiving a request for a page deeply linked within other pages; and means for sending a higher level page, in response to the request, along with an indication of a sequence of links from the higher level page to the deeply linked page.

* * * * *